June 17, 1969   G. HEIDRICH   3,450,242
FLUID PRESSURE ENGAGED FRICTION COUPLING
Filed Jan. 29, 1968

INVENTOR.
Günther Heidrich
BY
Beaman & Beaman

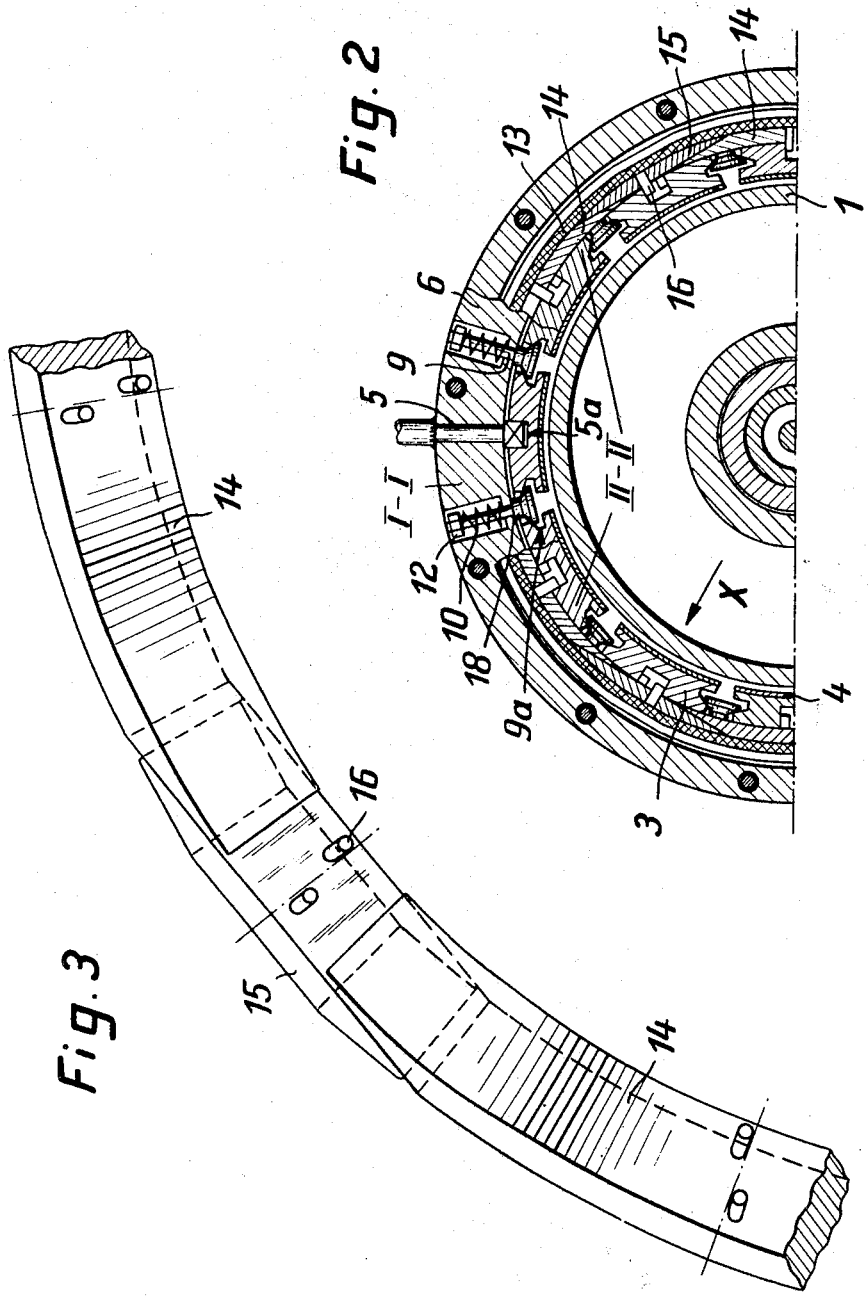

United States Patent Office 3,450,242
Patented June 17, 1969

3,450,242
FLUID PRESSURE ENGAGED FRICTION COUPLING
Gunther Heidrich, Munich, Germany, assignor to Alexander Wilhelm Stoeckicht, Munich-Solln, Germany
Filed Jan. 29, 1968, Ser. No. 701,245
Claims priority, application Germany, Feb. 7, 1967, St 26,468
Int. Cl. F16d *19/00, 21/00, 23/00*
U.S. Cl. 192—88                            11 Claims

ABSTRACT OF THE DISCLOSURE

The shoe and drum mechanism for a clutch or a brake consists of several friction shoes radially movable into engagement with the drum by action of a pressure medium which can be supplied to an annular recess provided in the case. The shoes are retracted into the disengagement position by springs when the annular recess is depressurized. Special bolts radially guided in the case extend with their heads into coaxial guide grooves on the rear sides of the shoes. The mechanism allows to transfer the friction force to the case without impairment of the radial shoe movement and to automatically compensate small surface irregularities of the drum and/or the shoes.

Background of the invention

The invention relates to a fluid pressure actuated cylinder friction clutch or brake, in which independently radially movable friction shoes joining up with each other cover an annular cylinder like a piston. The gaps between the shoes and between the cylinder and the shoes are sealed by special means and other means are provided to transfer the friction force from the individual friction shoes to the case. The radial displaceability of the friction shoes must not be impaired by these means. Such a clutch or brake is known from the German Patent 871,235.

When using a brake or clutch of the type mentioned for example in planetary gearings, for engaging and disengaging aggregates, for engaging gears with different gear ratios, or to reverse the direction of rotation, the following requirements have been found to be especially important to be met by the clutch or brake:

(1) Easy replacement of the friction shoes when worn, without having to disassemble further parts of the brake, for example the brake housing or the sealing elements.

(2) The friction shoes must be capable of individual adjustment to the machine part to be braked in order to be able to compensate in this manner changes in shape and errors of assembly.

(3) The friction shoes should have a great volume of friction lining adapted to be worn.

(4) No forces are to be exerted on the machine part to be braked, in either an axial or transverse direction.

(5) In connection with highly loaded clutches and brakes, a quick dissipation of the heat generated by the friction is to be guaranteed, in order to avoid in this manner a heating to inadmissibly elevated temperatures, preferably of the sealing elements.

(6) The disengaged friction shoes should be spaced uniformly from the machine part to be braked by a distance sufficiently high to avoid friction losses.

(7) The clutch or brake is to be of an uncomplicated construction and a high operating safety, while needing little space, and must be economic to manufacture.

These requirements are not met in the desired degree by the known clutch or brake. The invention is now based on the problem of providing a clutch or brake which corresponds to the above mentioned requirements.

Summary of the invention

Taking the known clutch or brake as a basis, the problems are solved in that the friction force is transferred from each friction shoe to the housing by two bolts radially and movably guided with their shafts in the housing, said bolts extending with their heads into a groove formed coaxially in the friction shoe.

With the non-actuated clutch or brake the friction shoes are kept away from the machine part to be braked by the cooperation of coaxially extending grooves formed in opposite side faces of adjacent friction shoes and the heads of other bolts guided at, or adjacent to the two ends of said grooves, the shafts of said bolts being movably guided in the housing and are biased such that the bolts draw the friction shoes radially outwardly. Preferably, the bolts are biased by a coil spring.

In order to guarantee that the friction shoes are securely drawn radially outwardly by the bolts, the surface of the bolt head contacting the groove surfaces preferably is formed conically and the said groove surface extends obliquely in correspondence with the bevelling of the bolt head.

According to another embodiment of the invention, the annular cylinder is closed towards the friction shoes by an endless elastic sealing sleeve.

First and second thin steel segments are arranged between the sealing sleeve and the friction shoes preferably in alternate arrangement, said segments overlapping the gaps between the individual friction shoes.

The segments preferably overlap each other at their bevelled ends, the first segments having a vaulted underside and the second segments having a plane underside. A displacement of the segments in a peripheral direction is avoided by the segments being secured in position by pins extending into the coaxial grooves for the bolts transferring the friction force.

In accordance with another embodiment of the invention, the friction shoes are cooled by one of the bolts transferring the friction force being provided with bores through which a coolant is supplied via a bore in the housing to the space defined by the groove in the friction shoes and the heads of the two bolts extending into this groove. The cooling of the friction shoes may be rendered more effective by providing the outer periphery of the friction shoes with circumferentially extending channels for the coolant.

The clutch or brake according to the invention is distinguished over the known clutch or brake especially in that it is possible to replace the friction shoes without disassembling the brake housing and at the same time removing also the sealing elements.

The clutch or brake in accordance with the invention allows to utilize the entire width of the housing for the width of the friction surface. This enlargement of the effective friction surface makes possible the transmission of a greater brake torque or, basing the constructions on the same brake torque, the clutch or brake in accordance with the invention may be designed to have a smaller diameter. Due to the simply and safely cooling the friction shoes, the sealing between the cylinder and friction shoes may be made especially effective as an elastic ring. The cooling of the friction shoes furthermore yields the advantage that the friction lining is not excessively heated and, therefore, the friction value thereof will be more constant.

Owing to the fact that the bolts and springs adapted to lift the friction shoes from the machine part to be braked, are arranged at the four corners of the friction shoes, a uniform lifting and a equal distance of the lifted shoes from the machine part to be braked is obtained.

Due to the transfer of the friction force to the housing by two bolts for each friction shoe, which extend by their heads into an coaxial groove of the friction shoe and are movably guided by their shafts in radial bores in the housing, the friction shoes may adapt themselves to transitory or permanent changes in the surface shape possibly occurring in the machine part to be braked or the friction shoes, because the rotatable bolts permit a slight angular movement of the friction shoes.

*Brief description of the drawing*

FIG. 2 shows a cross-sectional view of the brake according to FIG. 1 taken on lines I—I and II—II, FIG. 3 shows three of the steel segments arranged between the sealing sleeve and the friction shoes in a brake according to FIGS. 1 and 2.

*Description of the preferred embodiments*

Figure 1:
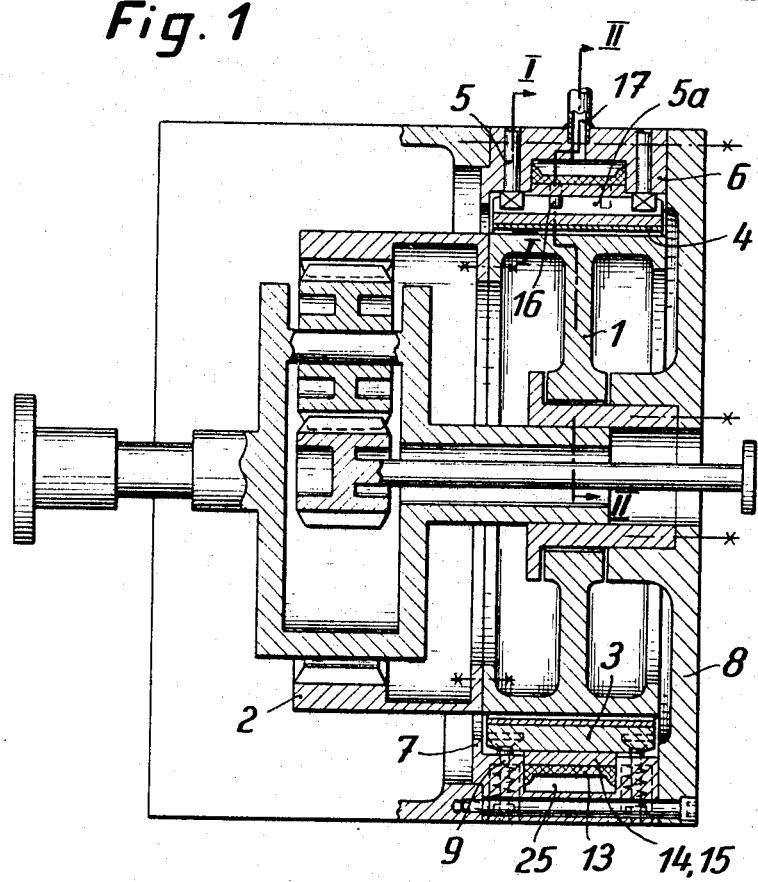
FIG. 1 is a diametral cross-sectional view of a brake according to the invention connected with a planetary gearing.

FIGS. 1 and 2 show cross-sectional views of a brake according to the invention connected with a planetary gearing which forms no part of the invention.

Twelve similarly designed friction shoes 3 are arranged around a brake drum 1, which is positively connected with the outer center gear 2 of the planetary gearing. A sintered-on friction lining 4 of sinter material of a relatively great thickness is disposed on the inner side of these friction shoes 3. Each friction shoe 3 is guided radially movably by two bolts 5. The bolts are extending with their square heads into a groove 5a in the friction shoes 3 and are guided by their shafts in corresponding bores arranged in the brake housing 6. The friction brake shoes 3 are retained in their position with some clearance with respect to axial displaceability by the flange 7 of the brake housing and the divided housing lid 8.

The lifting of the friction shoes 3 from the brake drum 1 is effected by the bolts 9 which have their heads engaging in longitudinal grooves 9a formed at the opposite sides of adjacent friction shoes 3. These bolts 9 are kept under a tension by coil springs 10 the one end of which is supported at the brake housing 6 and the other end is supported at a nut 12 at the upper end of the bolt 9.

The brake housing 6 is undivided and comprises an inner annular recess with an endless elastic sealing sleeve 13 made of a synthetic caoutchouc placed therein. Between the sealing sleeve 13 and the friction shoes 3, thin-walled steel segments 14 and 15 are disposed which overlap the gaps between the individual friction shoes 3 which gaps are necessary in order to displace the friction shoes unobstructedly inwardly when engaging the brake. The segments, three of which are individually shown in FIG. 3, are alternately provided with vaulted (segments 14) and plane (segments 15) bottom sides. The ends of the segments are provided with bevels. The thickness of the segments is selected to be such that even after the friction lining 4 has been completely worn-off a jumping of the sealing sleeve 13 out of the cylinder formed in the housing 6 is safely avoided with engaged friction shoes.

The segments are fixed in the peripheral direction by the pins 16 fastened therein, said pins being guided for axial movement in the grooves 5a.

If the brake is to be engaged, a pressure medium is supplied through the bore 17 into the space of the cylinder 25 in the brake housing 6, said cylinder being closed towards the interior by the sealing sleeve 13. Hereby, the friction shoes are pressed via the steel segments 14 and 15 inwardly against the drum 1 to be braked.

An optimal movability of the friction shoes 3 is obtained by a correspondingly great play in the radial and axial goides of the friction shoes 3 and by the pivotable support of the bolts 5 in the brake housing 6, whereby each individual friction shoe may adjust itself unobstructedly with respect to the drum 1 to be braked at the beginning of the frictional engagement, thus guaranteeing an adaptation to possibly occurring transitory or permanent changes in the form of the drum and/or the friction shoes.

The peripheral force is transferred from each individual friction shoe 3 to the brake housing by means of the bolts 5.

As all the friction shoes 5 are pressed inwardly with the same pressure, there results also a uniform distribution of the peripheral force on the individual bolts 5. The brake drum 1, consequently, is free of any forces acting in the axial or transverse direction.

If the brake is to be disengaged, the fluid pressure acting on the sealing sleeve 13 is cut off. The friction shoes will then immediately be disengaged by the force of the coil springs 10 via the bolts 9. Owing to the fact that the bolts 9 are arranged at the four corners of each friction shoe 3, a uniform lifting and a uniformly dimensioned distance of the friction shoes from the rotating drum 1 is secured.

If replacement of the friction shoes 3 becomes necessary because the friction lining 4 is worn, this replacement may be carried out without any other parts of the brake having to be dismantled. Only the split housing 8 has to be removed. As the disengaging movement of the friction shoes 3 is limited by a shoulder 18 arranged at the bolt 9 the shoes 3 are retaiend solely by the taper heads of the bolts 9 without being biased by the force of the springs 10. Thereby an easy axial displaceability of the friction shoes 3 for replacement thereof is made possible.

Only one friction shoe 3 is to be withdrawn at a time and replaced by a new one. The steel segment 14 or 15, respectively, associated with the removed friction shoe 3 is then kept in its position unchanged by the two adjacent friction shoes 3. The insertion of the new friction shoes 3 is much facilitated by the taper head of the bolts 9 because when pushing in the friction shoes, the end edges of the grooves for the bolts 9 slide along the conical surfaces of cone section lines (hyperboles) in parallel with the axes of the bolts, thereby gradually lifting the friction shoe 3 into a position allowing a further pushing the shoe into the final position.

Figure 4:
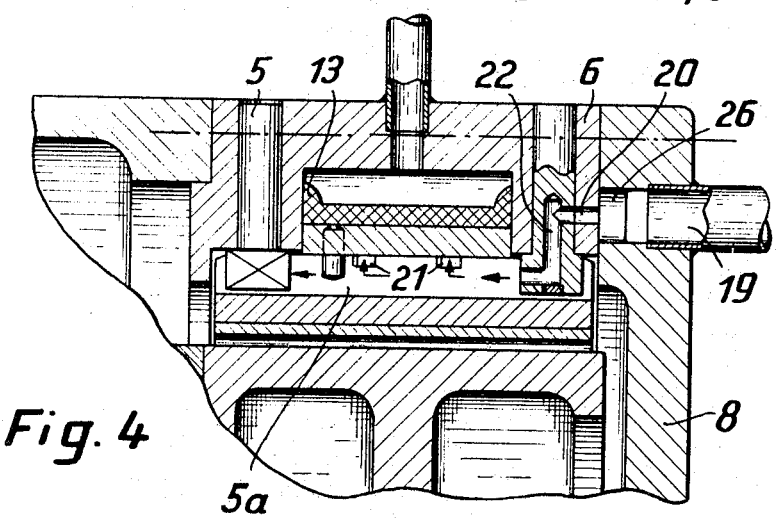
FIG. 4 shows a cross-sectional view of a friction shoe through which a coolant flows.

With thermally highly stressed brakes, a cooling of the friction shoes 3 may be provided in accordance with the embodiment of FIGURE 4, which provents inadmissibly elevated temperatures, for example of the sealing sleeve 13.

With a so designed clutch or brake, cooling oil is supplied to annular passage 26 in the housing lid through a cooling oil supply line 19 at the housing lid 8.

Said annular passage 26 distributing the cooling oil uniformly over bores 20 provided in the housing 6 to the twelve bolts 5 adjacent the lid 8, which bolts are provided with oil guiding bores 22 in the interior and pass the oil on into the free space of the friction shoe groove 5a which is defined by the walls of this groove and the heads of the bolts 5.

Owing to the fact that the cooling oil becomes effective in the center of the friction shoes and thus at the place of strongest heat concentration an optimum cooling effect is obtained. An additional distribution of the cooling oil over the surface of the friction shoes and thus also a quick discharge of the cooling oil is made possible by special circumferentially extending grooves 21 in the outer surface of the friction shoes.

What I claim is:

1. Shoe-and-drum mechanism for the actuation of a clutch or a brake comprising
    a drum coaxially mounted at and rotatable with the wheel to be braked,
    several shoes separated from each other by gaps and arranged around said drum for radial and independent movement, the back side of each shoe being provided with a coaxially extending guide groove, a case around said drum-and-shoes formed with an annular recess at the inside thereof, said recess being covered by said shoes and adapted to be pressurized by a fluid the pressure of which is acting into said shoes, packing means for sealing the recess volume to be pressurized against said shoes, means adapted to draw the shoes out of engagement with said drum when said annular recess is depressurized, and bolts guided with their shafts in radial bores provided in said case and extending with their heads into said guide grooves, two bolts being provided for each groove, whereby the friction forces acting on each shoe can be transferred to the case without impairing the radial shoe movement.

2. Shoe-and-drum mechanism for the actuation of a clutch or a brake comprising a drum coaxially mounted at and rotatable with the wheel to be braked, several shoes separated from each other by gaps and arranged around said drum for radial and independent movement, the back side of each shoe being provided with a coaxially extending guide groove and the side faces defining said gaps between the shoes are formed with coaxially extending side grooves, a case around said drum-and-shoes formed with an annular recess at the inside thereof, said recess being covered by said shoes and adapted to be pressurized by a fluid the pressure of which is acting onto said shoes, packing means for sealing the recess volume to be pressurized against said shoes, first bolts guided with their shafts in said case for radial movement and biased for automatical retraction into said case, the heads of said bolts being in engagement with the opposite side grooves of adjacent shoes, and second bolts guided with their shafts in radial bores provided in said case and extending with their heads into said guide grooves, two bolts being provided for each groove, whereby the friction forces acting on each shoe can be transferred to the case without impairing the radial shoe movement.

3. Shoe-and-drum mechanism in accordance with claim 2, wherein the first bolts are biased by means of coil springs and are arranged at or adjacent to the ends of said opposite side grooves.

4. Shoe-and-drum mechanism in accordance with claim 2, wherein the head of said first bolts is tapered and said side grooves are bevelled in correspondence with the tapering of the bolt head.

5. Shoe-and-drum mechanism in accordance with claim 1, wherein said packing means for sealing said annular recess is an annular elastic gasket.

6. Shoe-and-drum mechanism for the actuation of a clutch or brake comprising a drum coaxially mounted at and rotatable with the wheel to be braked, several shoes separated from each other by gaps and arranged around said drum for radial and independent movement, the back side of each shoe being provided with a coaxially extending guide groove, a case around said drum-and-shoes formed with an annular recess at the inside thereof, said recess being covered by said shoes and adapted to be pressurized by a fluid the pressure of which is acting onto said shoes, packing means for sealing the recess volume to be pressurized against said shoes, first and second solid segments arranged alternately between said packing means and said shoes and overlapping said gaps between said shoes, said first and second segments being movable relative to each other in the peripheral direction, means adapted to draw the shoes out of engagement with said drum when said annular recess is depressurized, and bolts guided with their shafts in radial bores provided in said case and extending with their heads into said guide grooves, two bolts being provided for each groove, whereby the friction forces acting on each shoe can be transferred to the case without impairing the radial shoe movement.

7. Shoe-and-drum mechanism in accordance with claim 6, wherein said segments are provided with bevelled end faces overlapping each other.

8. Shoes-and-drum mechanism in accordance with claim 6, wherein the first segments have vaulted undersides and the second segments have plane undersides.

9. Shoes-and-drum mechanism in accordance with claim 6, wherein the segments are provided with pins projecting into said guide grooves of said shoes.

10. Shoes-and-drum mechanism for the actuation of a clutch or a brake comprising a drum coaxially mounted at and rotatable with the wheel to be braked, several shoes separated from each other by gaps and arranged around said drum for radial and independent movement, the back side of each shoe being provided with a coaxially extending guide groove, a case around said drum-and-shoes formed with an annular recess atthe inside thereof, said recess being covered by said shoes and adapted to be pressurized by a fluid the pressure of which is acting onto said shoes, packing means for sealing the recess volume to be pressurized against said shoes, means adapted to draw the shoes out of engagement with said drum when said annular recess is depressurized, and bolts guided wtih their shafts in radial bores provided in said case and extending with their heads into said guide grooves, two bolts being provided for each guide groove, connected bores being arranged in a bolt and in the case adapted to pass a coolant therethrough into the guide groove between the two bolt heads guided in this groove.

11. Shoe-and-drum mechanism in accordance with claim 10, wherein the outer periphery of the shoes is provided with circumferentially extending grooves for the coolant.

References Cited

UNITED STATES PATENTS 2,382,570   8/1945   Kraft _____ 192—113.2 X
2,832,442   4/1958   Durst.

FOREIGN PATENTS 681,282   10/1952   Great Britain.

BENJAMIN W. WYCHE III, *Primary Examiner.*

U.S. Cl. X.R.

74—785; 188—152; 192—113